United States Patent
Judge et al.

(10) Patent No.: US 6,430,570 B1
(45) Date of Patent: Aug. 6, 2002

(54) JAVA APPLICATION MANAGER FOR EMBEDDED DEVICE

(75) Inventors: Frank P. Judge; Chia-Chu Dorland, both of Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/259,616

(22) Filed: Mar. 1, 1999

(51) Int. Cl.[7] .............................................. G06F 17/00
(52) U.S. Cl. ...................... 707/103; 707/102; 709/316; 717/166
(58) Field of Search ................................ 709/315–316, 709/320–332, 200–224; 713/1, 2, 100; 717/114, 162–168; 707/1–206

(56) References Cited

U.S. PATENT DOCUMENTS

| | | | | |
|---|---|---|---|---|
| 5,991,795 A | * | 11/1999 | Howard et al. .............. | 709/201 |
| 6,026,474 A | * | 2/2000 | Carter et al. .................. | 707/10 |
| 6,073,173 A | * | 6/2000 | Bittinger et al. ............ | 709/224 |
| 6,151,607 A | * | 11/2000 | Lomet ........................ | 707/202 |
| 6,173,318 B1 | * | 1/2001 | Jackson et al. ............. | 709/203 |

OTHER PUBLICATIONS

Gosling et al., The Java Language Specification, 1996, pp. 218–219, 558–560, 1996.*
Schimkat et al., "Scalability and iteroperability in service–centric architecture for the Web", Database and Expert Systems Applications, 2000. Proceedings, 11th International Workshop on Sep. 2000.*
Kastner et al., "A new approach for Java in embedded networks", Factory Communications Systems, 2000. Proceedings. 2000. IEEE International Workshop on Sep. 2000.*
Nieva et al., "Jini technology applied to railway systems", Distributed Objects and Applications, 2000. Proceedings. DOA '00. International Symposium on Sep. 2000.*

* cited by examiner

*Primary Examiner*—David Jung

(57) ABSTRACT

An application manager for managing applications in an embedded device is presented. The application manager allows remote control of loading, starting, stopping, unloading, application state querying of applications on an embedded device. Applications are cached in an application cache resident within the embedded device even after application termination to allow for higher efficiency when applications must be unloaded to handle low- or out-of memory conditions.

20 Claims, 9 Drawing Sheets

JAVA APPLICATION MANAGER FOR EMBEDDED DEVICE

BACKGROUND OF THE INVENTION

In the embedded device environment, a hardware independent processor such as a Java Virtual Machine is often installed on the device to allow a program to be downloaded and executed on the device. Such a system allows a program written in a hardware independent language such as Sun MicroSystem's Java® to be downloaded to any hardware supporting the Java® environment in order to customize it for a particular use. This customization is often referred to as the "personality" of the device. Multiple applications may be running in concert within an embedded device to define the device's personality. In this way the device can dynamically be made to function in different unique ways. For example, an embedded device such as a refrigerator may be customized to automatically track its contents. Just as the types of food and naming conventions of similar foods may differ from culture to culture, the embedded device refrigerator may be customized to the particular culture of the users by downloading a new personality describing the food types and naming conventions to the Java enabled embedded refrigerator device.

In the embedded device domain, a hardware independent processor such as a Java® Virtual Machine is installed on the device to allow applications to be downloaded and executed on the device. The Java® language provides basic capabilities to build programs to dynamically load new programs. However, the Java® language does not provide implementations of program loaders, nor capabilities to manage programs once loaded. The Java® language also does not provide a means of downloading and managing applications within a memory constrained embedded device.

Several existing Java technologies support a program loader type of functionality. Sun Microsystems's Servlet API allows a Java® enabled Web server to dynamically extend the capabilities of the server. The Servlet API was mainly created to replace the typical CGI functionality in web servers. The benefits of servlets over CGI type programs include platform independence, reusability (the ability to reuse Java classes through object oriented techniques), performance efficiency (the configurable startup modes of Servlet which allows the same servlet instance to handle many requests (as opposed to the requirement of creating a new process for each call to a CGI script)), and management efficiency (Sun's Java based web server provides a Java admin applet which easily administers the addition of new servlet classes, and the starting and stopping of servlets).

The Servlet API defines a lifecycle for a servlet by mandating that all servlets implement three methods: init( ), service( ), and destroy( ). The init( ) method is called when the servlet is invoked for first time; the service( ) method is called to handle each request from a client; and the destroy( ) method is called when the servlet is being stopped (i.e. web server shutdown). The Servlet API does not directly support memory management or provide a public package for managing servlets.

Hewlett Packard's Embedded Java Lab SmallWeb provides a web based interface to Java based objects executing in a JVM. SmallWeb can load objects as needed, and provides a means for objects to export their functionality (through method calls) to web browsers. SmallWeb does not explicitly provide stopping of application objects or memory management features. In addition, SmallWeb usually requires a file system, and for some embedded environments the overhead requirements of SmallWeb may be too large.

One problem of using Java® in many embedded domains is the non-deterministic aspects of the Java® memory subsystem. The non-deterministic memory management scheme of the Java® language allows the reclamation of un-referenced objects through a garbage collector method gc( ); however, the garbage collector does not specify how or when these objects are reclaimed. Native applications typically force garbage collection to occur by calling the Java® Runtime class gc( ) method. If the JVM runs out of memory, an OutOfMemoryError error is thrown. Although not having to manage memory is a benefit of the Java language, most embedded applications need tighter control over how memory is managed than currently provided in the Java® language. The tighter control is needed because some embedded applications must continue to execute in low memory situations. This is typically dealt with by implementing a memory manager in the native non-Java embedded applications to ensure that enough memory remains free in order to continue executing.

Accordingly, a need exists for a universal method for downloading to, and controlling the lifetimes of applications in, a Java enabled embedded device. A need also exists for a memory management handler which handles low- or no-memory situations detected during the execution of applications on the device, and which frees up memory according to a priority-based algorithm.

SUMMARY OF THE INVENTION

The present invention is a novel system and method for managing the download and lifecycle of an application in a memory constrained embedded device environment. A Java based Application Manager controls the downloading, execution, and caching of Java applications running within a single Java Virtual Machine (JVM) installed on the embedded device. A network capable Application Program Interface (API) is specified which provides functionality for loading class files, starting, initializing and stopping the execution of applications, and memory management in a Java® enabled embedded device. The invention allows embedded devices to be easily re-programmed and managed independently of the type of hardware the embedded device uses.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel Application Manager for an embedded device is described in detail hereinafter. Although the invention is described in the context of a Java® environment, it will be appreciated by those skilled in the art that the principles of the invention extend to any system comprising a hardware independent processor for processing code written in a hardware independent language.

Figure 1:
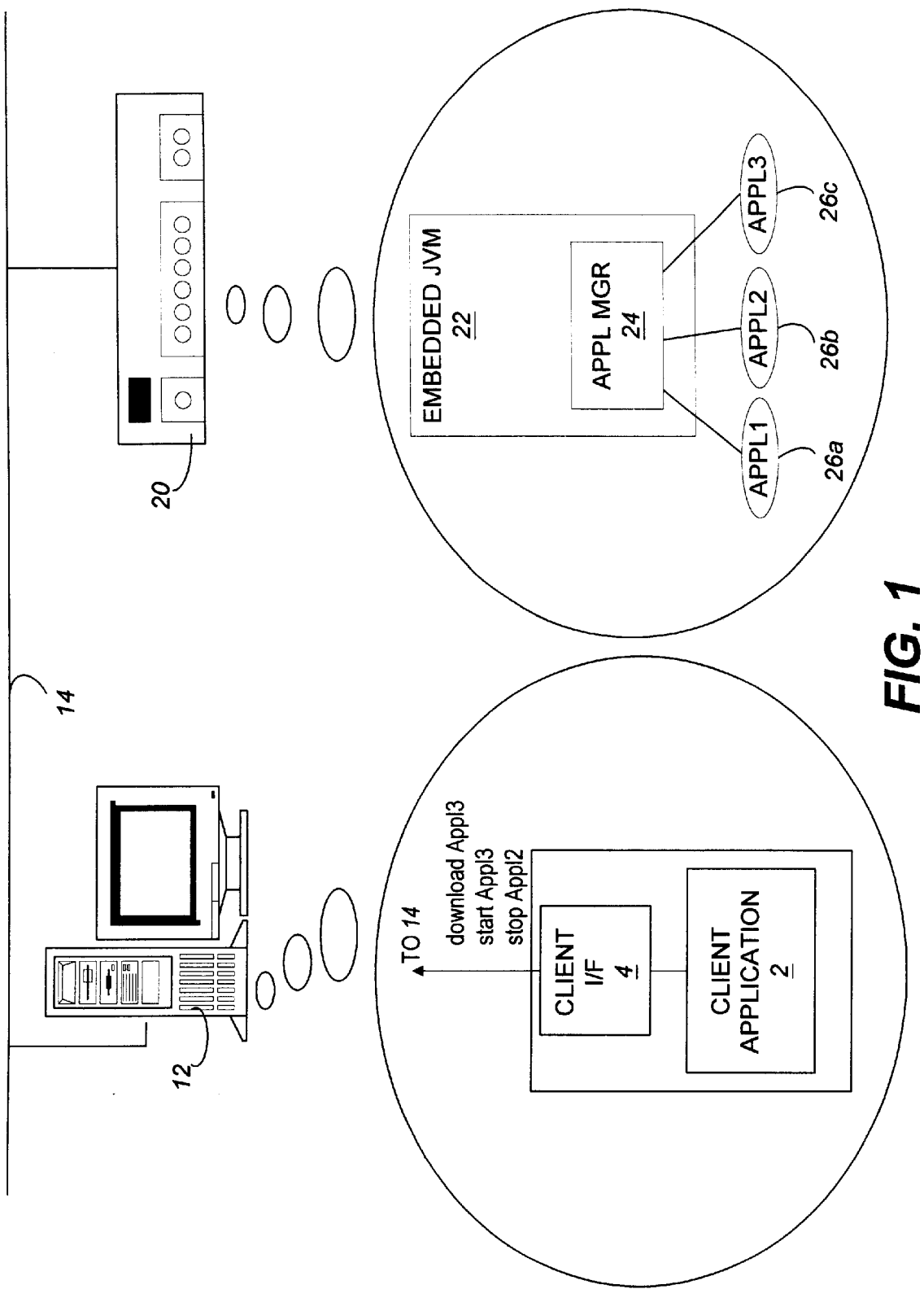
FIG. 1 is a system diagram of a network system in which the invention operates.

Turning now to FIG. 1, there is illustrated a networked system 10 comprising a computer system 12 in communication with an embedded device 20 over a network 14. Network 14 may be a conventional land-linked wired network such as a LAN or WAN, or may be a wireless network, or any combination thereof.

Computer system 12 in this system operates as a client, executing a client application 2 that interfaces with server devices (e.g., embedded device 20) over network 14 via a client interface 4. In this example, client application 2 sends requests (e.g., download Appl3, start Appl3, stop Appl2) to embedded device 20, which operates as a server to service the requests. Client application 2 may execute in its own environment on computer system 12, or alternatively within a Java-enabled Web browser (not shown) that contains its own Java Virtual Machine (JVM) (not shown). The web browser interprets Web documents with embedded Java applets that specify the location of the main client application applet class file. The web browser starts up its JVM and passes the location of the client application applet class file to its own class loader 6. Each class file knows the names of any additional class files that it requires. These additional class files may come from the network 14 (i.e., other machines coupled to the network 14) or the client computer system 12.

Figure 2:
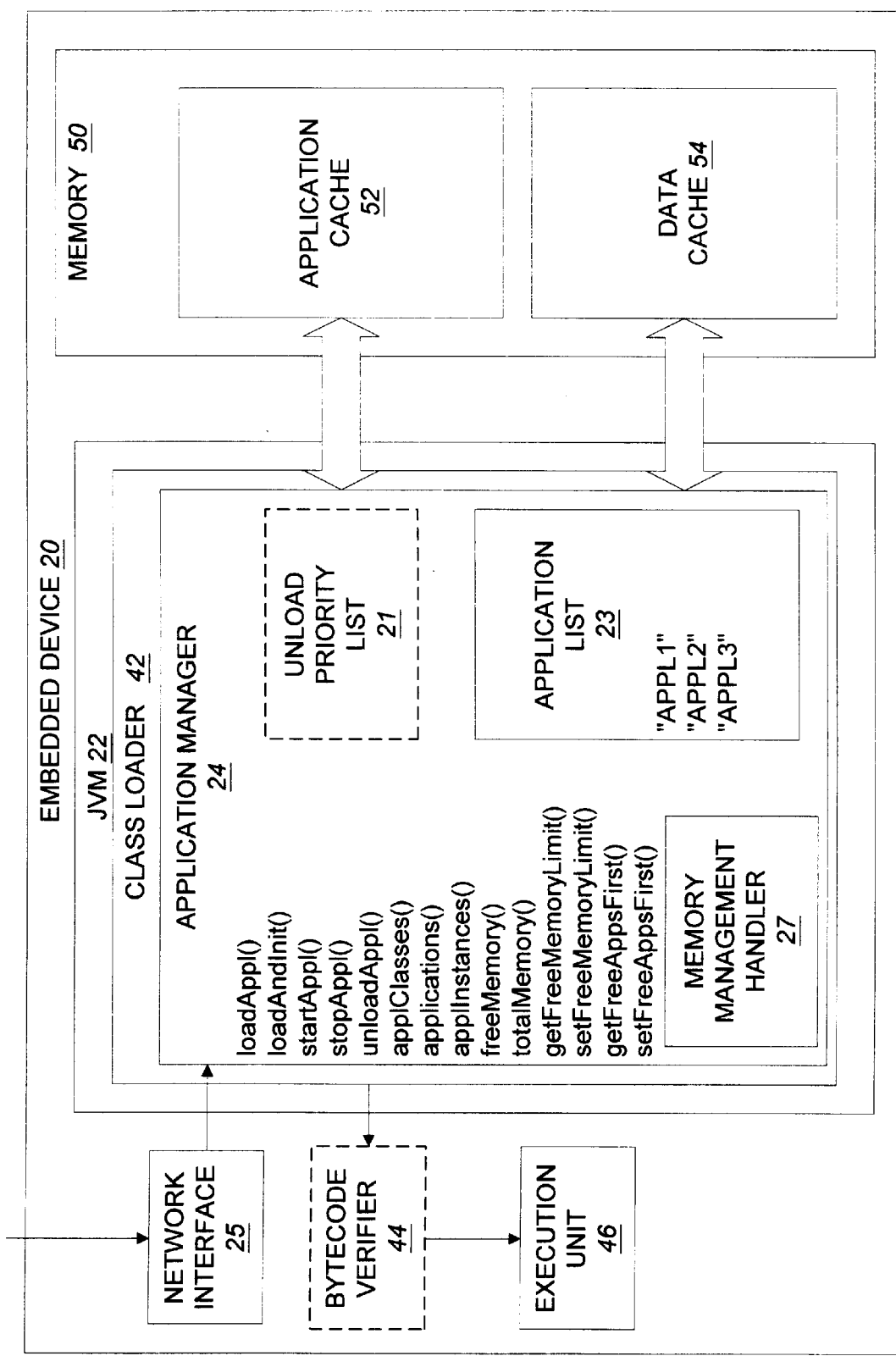
FIG. 2 is a block diagram of an embedded device in which the invention is implemented.

Embedded device 20 is a Java enabled device with a Java Virtual Machine (JVM) 22 installed on it. FIG. 2 is a block diagram illustrating the embedded device in more detail. Embedded device 20 comprises a JVM 22, a memory 50 comprising an application cache 52 and a data cache 54, and a network interface 25. JVM 22 comprises a class loader 42 and an execution unit 46. Preferably, JVM 22 also comprises a bytecode verifier 44, although in some memory-constrained devices this may not be implemented. In accordance with the invention, class loader 42 is implemented using the Application Manager 24 of the invention. Application Manager 24 is a Java program responsible for the downloading, execution, and caching of other Java based programs. When JVM 22 begins executing on embedded device 20, it begins executing Application Manager 24.

Application Manager 24 is a server device operating as a network based class loader able to accept application class files 40 over network 14 via a network protocol 48 and bring the application classes contained in the application class files 40 to life. As known by those skilled in the art, a class file 40 is a file comprising hardware architecture independent bytecodes generated by a Java® compiler. The bytecodes are executable only by a JVM, such as JVM 22. Application Manager 24 is a non-typical network based ClassLoader, loading classes 40 from the network 14 on demand. Instead of loading class files 40 through the Java® loadClass( ) method as normally done by typical class loaders, the Application Manager 24 instead waits on a server socket or other protocol 48 for a request to download class files 40. When a download request is received, Application Manager 24 receives the class file 40 from the network 14, parses it into classes 28a, 28b, and then calls the Java® ClassLoader defineClass( ) method. The class 28a, 28b should be resolved to ensure that it is ready for object instantiation by calling the Java® ClassLoader resolveClass( ) method.

Figure 3:
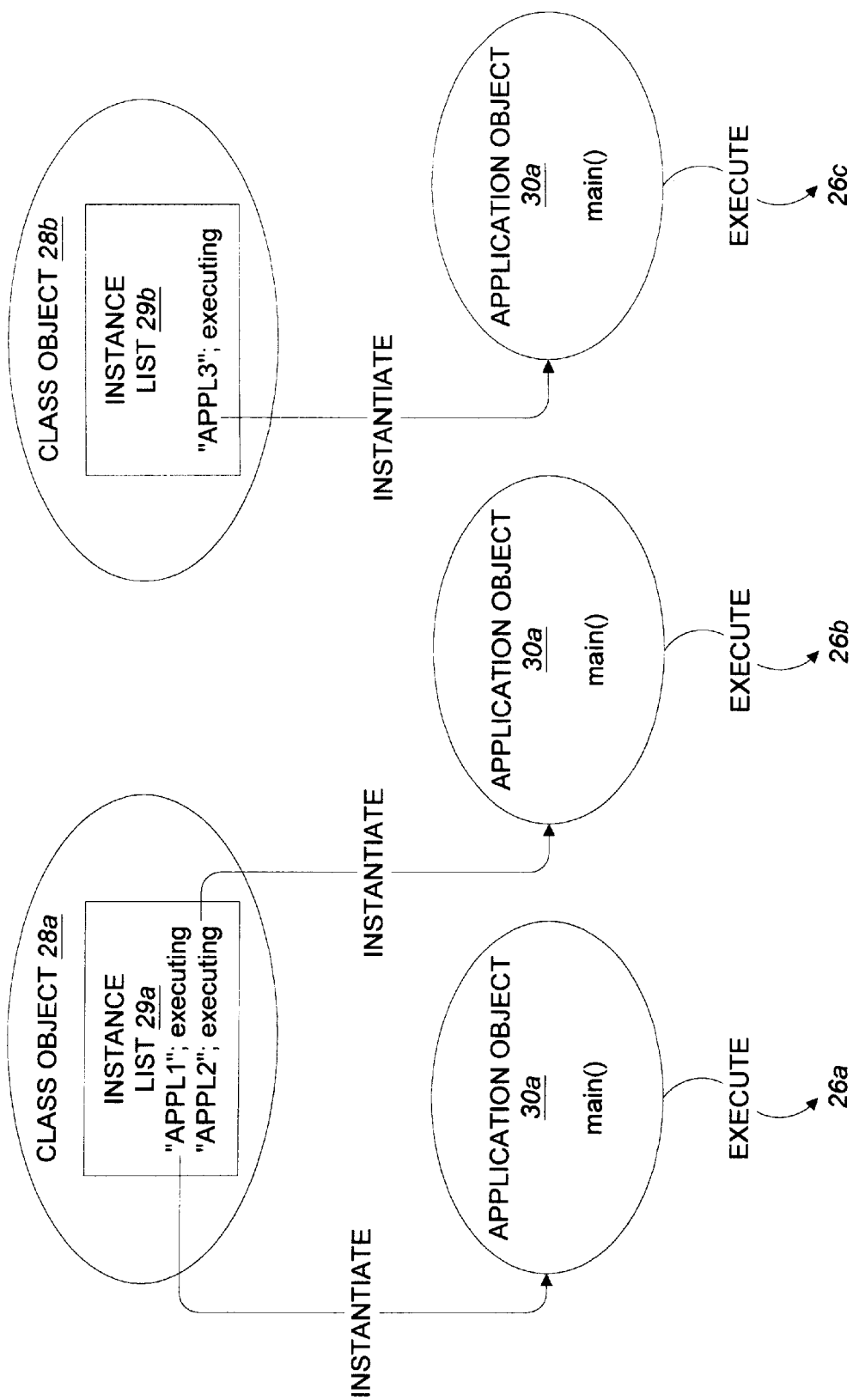
FIG. 3 is a flow diagram illustrating how an application is brought to life.

FIG. 3 illustrates how an application 26a, 26b, 26c is brought to life. As illustrated, this is accomplished by instantiating an application's Java class 28a, 28b, creating an instance object 30a, 30b, 30c of the class 28a, 28b, and then calling a main method on the object 30a, 30b, 30c to run the application 26a, 26b, 26c. Multiple instances of the same application may be executed simultaneously by creating multiple instances of the same Java® class. For example, as shown in FIG. 3, objects 30a and 30b are instances of the same class 28a, whereas object 30c is an instance of a different class 28b. Accordingly, applications 26a and 26b are different instances of the same application which may run simultaneously, while application 26c is an entirely different application.

Application Manager 24 provides downloading, starting, stopping, querying, and memory management capabilities. In order to provide these capabilities over network 14, embedded device 20 includes a network interface 25 implementing a network protocol 48 which allows clients 12 to send requests to the Application Manager 24 of the embedded device 20. In the preferred embodiment, network interface 25 speaks to Application Manager 24 using a universal Java language Application Program Interface (API) specified by Application Manager 24. The universal API provides remote devices such as computer system 12 with the ability to specify the desired management of the device 20. Appendix A lists the APIs defined in the illustrative embodiment of the invention.

In particular, Application Manager 24 allows new applications to be downloaded to the device 20 over network 14. In the preferred embodiment, this is achieved via the API's loadApplClass( ) method. The loadApplClass( ) method handles the downloading and verification of Java class files 40, the loading of the application classes 28a, 28b contained in the class files 40 into the Java® environment on the device 20, and prepares the classes 28a, 28b to be executed by instantiating application objects 30a, 30b, 30c using either a Java interpreter or a Just in Time (JIT) compiler (not shown). Application Manager 24 also manages the starting and stopping of Java applications 26a, 26b, 26c on embedded device 20 to allow a user on computer system 12 or other networked device to control the execution of Java applications 26a, 26b, 26c loaded on the embedded device 20. In the preferred embodiment, this is achieved via the startApplo method and stopAppl( ) method of the universal API. Application Manager 24 also allows the querying of application information such as which class objects 28a, 28b are currently loaded, which classes have application instances 30a, 30b, 30c, and what execution state each application instance is in (e.g., "initialized", "executing", "terminated"). This is achieved in the preferred embodiment via methods applClasses( ), applications( ), and applInstances( ) respectively. The names of each loaded class object 28a, 28b is stored in an application list 23 as an attribute, preferably as a hash table, within the Application Manager 24 object. Application Manager 24 also allows querying of information from the Java environment such as the amount of free memory and the amount of total memory. In the preferred embodiment, this information is queried using the freeMemory( ) method and totalMemory( ) method. Application Manager 24 also provides memory management capabilities, including the ability to set limits on the required amount of free memory before a loaded application must be unloaded and the ability to set the order in which to unload cached applications. This is achieved in the preferred embodiment using the setFreeMemoryLimit( ) and setFreeAppsFirst( ) methods. The free memory limit and order in which to unload applications may be queried using the getFreeMemoryLimit( ) and getFreeAppsFirstPolicy( ) methods. This information is stored in a hash table within the Application Manager 24 object, either as a separate field for each application list 23 entry, or as a separate unload priority list 21.

Network protocol 48 is used to provide network access to Application Manager 24 via network interface 25. Network protocol 48 may be implemented according to any one of several alternative embodiments.

In a first embodiment, network protocol 48 is implemented using Java® Remote Method Invocation (RMI). Java RMI allows direct method calls to be made on objects residing in other JVMs. RMI typically requires a significant amount of memory to support object serialization, identification, and method dispatch. If the embedded device supports the high memory overhead of running RMI, including supporting the running of the RMI name server, RMI is a good implementation choice if the client application interacting with the embedded device 20 and Application Manager 24 is Java based. Bridges do exist between other distributed object mechanisms (e.g., CORBA, DCOM) and RMI, allowing clients to be written in other languages as well. Using RMI, the Application Manager 24 can accept direct calls from remote clients 12 to load, start, and manage applications 26a, 26b, 26c. A simple example of an RMI based Application Manager interface is provided in Appendix B.

In a second alternative embodiment, network protocol 48 is implemented using network sockets (e.g., TCP/IP socket protocol). If Java® is used on the client 12 side as well, it is beneficial to wrap the protocol 48 within a Java class ( or classes ) to ensure that the protocol 48 remains consistent on both the client 12 side and the server (embedded device 20) side. In order to ensure that the network protocol 48 does not perform blocking reads of the network causing either the client 12 or Application Manager 24 to possibly hang, a wait timeout is preferably set for read( ) operations via the Java® Socket.setSoTimeout( ) method or by using the Java® InputStream.available( ) method to determine how much data may be read without blocking.

In one implementation of such a network socket protocol scheme a single byte which identifies the method to be called, followed by additional data decoded by a wrapper for that specific method, is transmitted. For example, to download a class file 40, the client 12 transmits a 'D' character byte to signify that the request is for a download, followed by the total length of data being transmitted, followed by the network address of the embedded device 20. In another implementation, the actual data is a null-terminated character class name, followed by a byte signifying whether the class contains a main method or not, followed by bytes containing class data. An object model, supporting a virtual decode method is created to perform the protocol decoding. Returning method call results to the client 12 may also be encapsulated, with a similar protocol being used. In this way results are returned asynchronously from requests, and the client 12 can actually operate as a network server for results.

If the client 12 is only talking to one embedded JVM 22, and is idle waiting for results, a simpler scheme can be used where the client 12 waits (with a timeout) for results to come back synchronously.

In the preferred embodiment, Application Manager 24 is implemented as a Java network server application, which accepts requests coded into an application protocol 48 such as Java® Remote Method Invocation (RMI) protocol, HyperText Transport Protocol (HTTP) for Web hosted requests, or an application level protocol over TCP/IP sockets. As previously described, one type of request in the protocol 48 is the downloading of an application's Java class file 40. In the preferred embodiment, downloading of class files 40 are performed by calling method loadApplClass( ) or method loadAndInit( ). As previously described, a class file 40 is a binary Java bytecode stream used by the JVM 22 to create a Java class object 30a, 30b, 30c. In addition to downloading the application class file 40 into memory 50, any base classes that the application 26a, 26b, 26c inherits or that interface with the application classes 28a, 28b contained in the class file 40 are also downloaded into an application cache 52 in memory 50. Because the Application Manager 24 allows for caching of class files 40 in memory 50, the application protocol 48 allows for the execution of an already downloaded class file residing in memory 50 via method initAppl( ) followed by a startAppl( ) method call. Once a class file 40 is downloaded, the Java® ClassLoader API is used to instantiate the class objects 28a, 28b associated with the class file(s) 40. The ClassLoader.defineClass( ) method constructs a class object 28a, 28b from the class file byte array. Once defined, the class must be resolved to perform class linking, which allows instance object creation and methods calling. The resolution process is initiated by calling the Java® ClassLoader.resolveClass( ) API.

Once a class 28a, 28b is loaded and defined, an instance object 30a, 30b, 30c of the class 28a, 28b is created, in the illustrative embodiment through the Java® Class.newInstanceo API. The object 30a, 30b, 30c is needed to call the desired method to start the application 26a, 26b, 26c. In order to call newInstanceo, the class 28a, 28b must have a default constructor which takes no arguments.

The application 26a, 26b, 26c is executed by calling the desired method on the previously created object 30a, 30b, 30c, passing any arguments to the method. Application Manager 24 must know the method to call on the object and what arguments (if any) to pass. This may be accomplished in one of several ways.

In one embodiment, all applications are required to implement a Java interface which specifies the method to call. A sample interface is shown below:

public interface ApplBase
{
    public void main( InetAddress o);
}

This interface specifies an instance method, "main( )", which is the first method called when an application 26a, 26b, 26c executes. Because it is an instance method, an object 30a, 30b, 30c of the class 28a, 28b must be created by Application Manager 24 prior to executing maino. This object may be a Java® ApplBase object in the Application Manager 24 because only main( ) is being called. In this example, the main( ) method receives an InetAddress argument, which contains the network address of the client 12 which downloaded the class. In this way, the application can communicate back to the client 12 through a known port if needed.

In another embodiment, if the JVM 22 supports reflection, for example through Java® RMI, the method name is downloaded to Application Manager 24 and reflection is used to search the application class for the desired method. Once the class 28a, 28b is loaded, the Java® getDeclaredMethod( ) is called on the class to find the desired method. GetDeclaredMethod( ) returns a Method object, which can in turn be used to execute the method by calling invoke( ).

In yet another embodiment, a method which extends from a common base class that all applications inherit from is called.

Once executing, Application Manager 24 records the new running state of the application 26a, 26b, 26c. Each application class 28a, 28b includes a respective instance list 29a, 29b which identifies each instance that exists of its class. Each entry in the instance list 29a, 29b includes an execution state variable that is updated by Application Manager 24 during the lifecycle of the instant application 26a, 26b, 26c.

Application Manager 24 handles all Java® exceptions or errors occurring in the application 26a, 26b, 26c which would otherwise cause the JVM 22 to terminate. Upon application termination, Application Manager 24 records that the application 26a, 26b, 26c is no longer running (by updating the execution state corresponding to the instance identified in the instant list 29a, 29b), and causes the class object 28a, 28b to be garbage collected if the class 28a, 28b is not to be cached in memory 50.

Caching of classes 28a, 28b is a unique feature of the invention that allows for better performance. Instead of downloading the application class each and every time an application 26a, 26b, 26c is to be executed, the Application Manager 24 preferably caches the class object 28a, 28b by default and unloads the class 28a, 28b only when explicitly requested using the unloadAppl( ) method or when the memory management handler 27 selects the class to be unloaded as a result of a low- or no-memory condition. In the preferred embodiment, the order in which currently loaded classes are unloaded by the memory management handler 27 is set using the setFreeAppsFirst( ) method. The setFreeAppsFirst( ) method allows a client to set or change the order in which applications are unloaded in case of a low- or no-memory condition. This may be accomplished in any of several ways, including by adding an unload priority field to each entry in the application list which indicates the ranking of the application for unloading the class. By caching the class, the Application Manager 24 maintains a reference to the class, thereby forcing the Java Virtual Machine 22 not to garbage collect the class 28a, 28b. The application class 28a, 28b can then be re-used to create new instances 30a, 30b, 30c of the class 28a, 28b, and re-execute application functionality.

Application Manager 24 also preferably allows caching of application data in a data cache 54 in memory 50, even after an application has terminated and/or been unloaded. An example is Java applications in the electronic test domain. The first execution of the application could save setup information which allow future running of the application to execute faster. In this example, Application Manager 24 could cache test system calibration information Again, by caching the test system calibration information in data cache 54, Application Manager 54 maintains a reference to the data, thereby forcing the Java Virtual Machine not to garbage collect the data. Accordingly, data caching in this manner allows information to be saved for subsequent runs of the same or different application.

Application Manager 24 attempts to have applications 26a, 26b, 26c continue to execute in low- or no-memory situations. If, during the execution of an application 26a, 26b, 26c, the JVM 22 runs out of memory, an OutOfMemoryError error is generated. Application manager 24 includes a memory management handler 27 which handles low- or no-memory conditions. In the preferred embodiment, memory management handler 27 is triggered into action by the occurrence of an OutOfMemoryErorr generated by the JVM 22. In one embodiment, memory management handler 27 reacts by judiciously dumping class objects 28a, 28b and application objects 30a, 30b and 30c from its application cache. The order for unloading cached class object 28a, 28b and application objects 30a, 30b and 30c is set using the setFreeAppsFirst( ) method. Alternatively, the order is determined according to a predetermined algorithm coded within the memory management handler 27 itself. By calling the Java® Runtime.gc( ) method, Application Manager informs the JVM 22 that the unloaded class objects 28a, 28b and application objects 30a, 30b and 30c are available to be reclaimed. The unloading of class objects 28a, 28b from the application cache 52 forces the application objects 30a, 30b, 30c associated with the class 28a, 28b to be terminated and unloaded as well. Accordingly, if startup speed of application execution is important, it may be preferable to unload application objects 30a, 30b and 30c before unloading class objects 28a, 28b. On the other hand, if it is important to keep a particular application running regardless, if may be preferable to unload all application objects of another class along with the class associated with those objects in order to free up enough memory to keep the particular application running. Solutions to having applications terminate is to separately monitor memory levels reacting to low memory conditions, or to checkpoint application results allowing applications to be restarted continuing after a checkpoint. These approaches may allow executing applications to continue uninterrupted, or at least as close to uninterrupted as possible.

Application Manager 24 preferably provides memory management functionality. In one embodiment, Application Manager 24 references class objects 28a, 28b, application objects 30a, 30b, 30c and global data in respective application 52 and data 54 caches, thereby ensuring that their associated objects are not garbage collected.

In an alternative embodiment, memory management handler 27 continuously monitors the free memory level, and in times of low- or no-free memory, removes objects from its caches 52, 54 and triggers garbage collection to free up more memory as needed. As previously described, garbage collection is triggered by calling the Java® Runtime.gc( ) method after removing items from the application cache 52 or data cache 54. A choice must be made when implementing an Application Manager 24 as to how it manages the memory 50 in low memory situations. One choice is which cache, application cache 52 or data cache 54, is to have items removed from it first when low free memory occurs. In most cases it may be easier to remove application objects 30a, 30b, 30c and associated class objects 28a, 28b, and re-download them as needed. This decision is predicated on the long amount of time it may take to recreate global data.

Application and global data objects are preferably designed to be as separate as possible for the caching scheme to work correctly. If a global data class is referenced as a member of a class object 28a, 28b, then unreferencing the data class will do nothing to free up memory unless the class object 28a, 28b is also unreferenced. The reverse case of a global data class referencing a class object 28a, 28b also causes the same result. Class objects 28a, 28b should only reference global data classes in methods, not in class members. Preferably, global data objects never reference class objects 28a, 28b.

Figure 4:
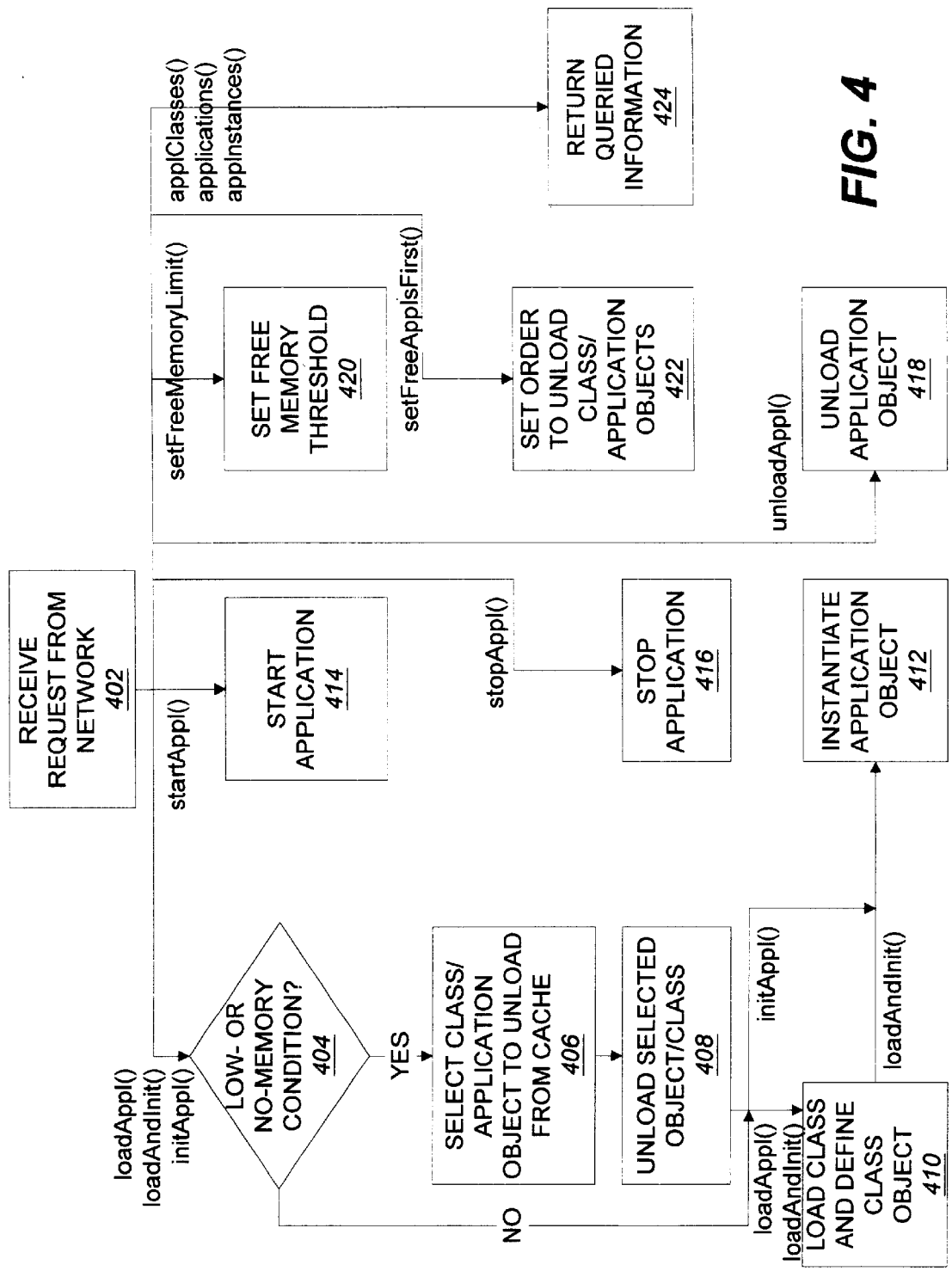
FIG. 4 is an operational flowchart of one embodiment of an application manager implemented in accordance with the invention.

FIG. 4 is an operational flowchart illustrating an exemplary embodiment of the management of application class cache 52. Application Manager 24 receives 402 a request from a client 12. If the execution of the request would result in the use of free memory (e.g., loadAppl( ), loadAndinit( ), Initappl( )), a determination 404 is made as to whether the execution of the received request would result in a low- or no-memory condition. If so, class object(s) 28a, 28b and/or application object(s) 30a, 30b, 30c are selected 406 to unload from the application cache 52. The selected object(s) are then unloaded 408 from the application cache 52. If the received request is a loadAppl( ) or loadAndinitAppl( ) request, a class object is loaded from the network 14 and defined 410. If the request is a loadApp( ) request, the request is then complete. If the request is a loadAndinitAppl( ) request or an InitAppl( ) request, an application object 30a, 30b, 30c is instantiated 412 and the request is complete. If the request is a startAppl( ) request, the application is started 414, typically by calling a main( ) method on the application object 30a, 30b, 30c. If the request is a stopAppl( ) request, the application is stopped 416. If the request is an unload( ) request, the class object 28a, 28b is unloaded 418. If the request is a setFreeMemoryLimit( ) request, the free memory threshold, upon which a low-memory condition is based, is set 420. If the request is a setFreeAppsFirst( ) request, the order in which application classes 28a, 28b and object classes 30a, 30b, 30c are selected for unloaded upon the detection of a low- or no-memory condition is set 422. If the request is a query (e.g., which application classes are loaded (applClasses( )), which applications are initialized (applications( )), which applications are currently running (applInstances( )), how much available memory exists (freeMemory( )), how much total memory exists (totalMemory( )), what the existing free memory limit threshold is (getFreeMemoryLimit( )), or what the existing order for unloading class and application objects is (getFreeAppsFirstPolicy( ))), the query is executed 424 with the requested parameter returned.

When it is determined 404 that a low- or no-memory situation exists, in the illustrative embodiment Application Manager 24 removes references to the objects that are chosen to be unloaded and causes the unreferenced objects to be removed from the application cache 52 by calling the Java® Runtime.gc( ) method. As described earlier, only unreferenced classes 28a, 28b are removed from the cache 52 because only unreferenced classes can be garbage collected by the Java® Runtime.gc( ) method. In some JVM 22 implementations, the class's ClassLoader object may also have to be unreferenced for the class to be garbage collected.

Figure 5:
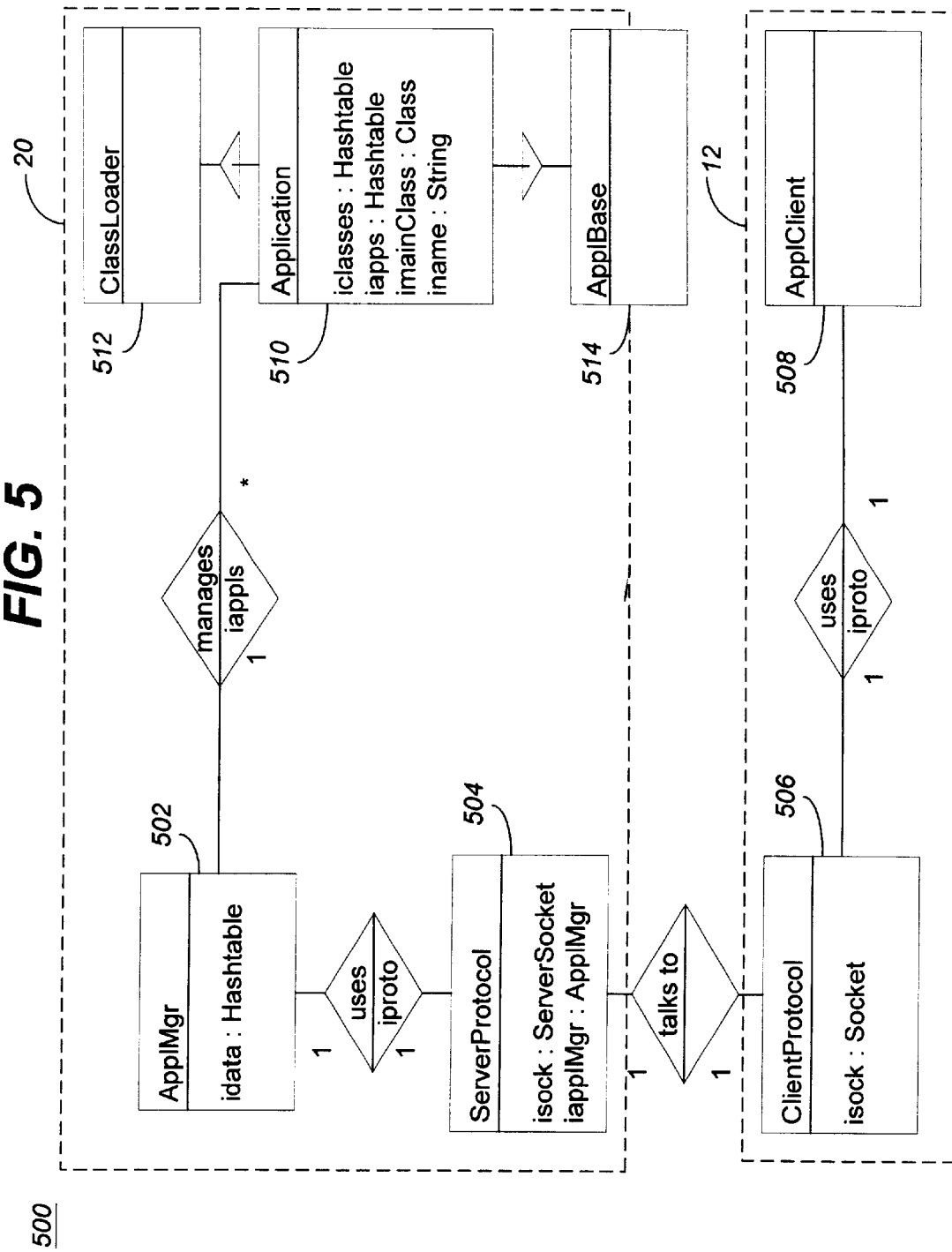
FIG. 5 is a class diagram of one implementation of an application manager implemented in accordance with the invention.

FIG. 5 is a class diagram illustrating an example implementation of a system 500 which employs the invention. A description of each of the classes defined and used in the example implementation of FIG. 5 is shown below in Table 1. Table 2 contains a description of the main attributes defined in each of the classes used in the example implementation of FIG. 5. As illustrated in FIG. 5, class ApplMgr 502 manages one-to-many instances of Application class 510. Class ApplMgr 502 uses a ServerProtocol class 504 which talks to a ClientProtocol class 506 in order to interface with a client class ApplClient 508. As described in Table 1, class ApplMgr 502 is the class that implements the Application Manager 24. Application class 510 models a single application. ServerProtocol class 504 and ClientProtocol class 506 implements client interface 4. Together they encapsulate the network protocol 48 between the Application Manager class ApplMgr 502 and client class ApplClient 508.

TABLE 1

| Class | Description |
| --- | --- |
| ApplMgr | Overall Application Manager class |
| Application | Models a single application |
| ServerProtocol, ClientProtocol | Encapsulates the network protocol between ApplMgr and ApplClient classes representing the interface supported by the ApplMgr. |
| ApplBase | Interface defining methods which an Application must define to be used by the ApplMgr |
| ApplClient | Example client side application to interact with an ApplMgr class |

TABLE 2

| Name | Category | Description |
| --- | --- | --- |
| ApplMgr.idata | attribute | Hashtable of global data values which need to persist beyond the lifetime of an Application class. Accessed through get and set methods. |
| ApplMgr.iappls | attribute | Collection of Application objects which ApplMgr has been told to manage. |
| Application.iclasses | attribute | Hashtable of classes associated with this Application. Classes are uniquely identified by name. A class hierarchy may be used to create an application, which requires the use of a Hashtable. |
| Application.iappls | attribute | Collection of instances of applications currently executing. Instances are identified by the classname, and an instance counter is incremented for each instance created. |
| Application.imainClass | attribute | The class which contains the main() routine to be executed. The application object to be executed is created from this class. |
| ServerProtocol.isock | attribute | ServerSocket used for communication to the ApplMgr. |
| ServerProtocol.iapplMgr | attribute | The ServerProtocol decodes any request, then makes the appropriate call on the ApplMgr to handle the request. ServerProtocol may alternatively be replaced with direct RMI calls to ApplMgr. |
| ClientProtocol.isock | attribute | Socket by which the ClientProtocol communicates with the ServerProtocol. |

Figure 6:
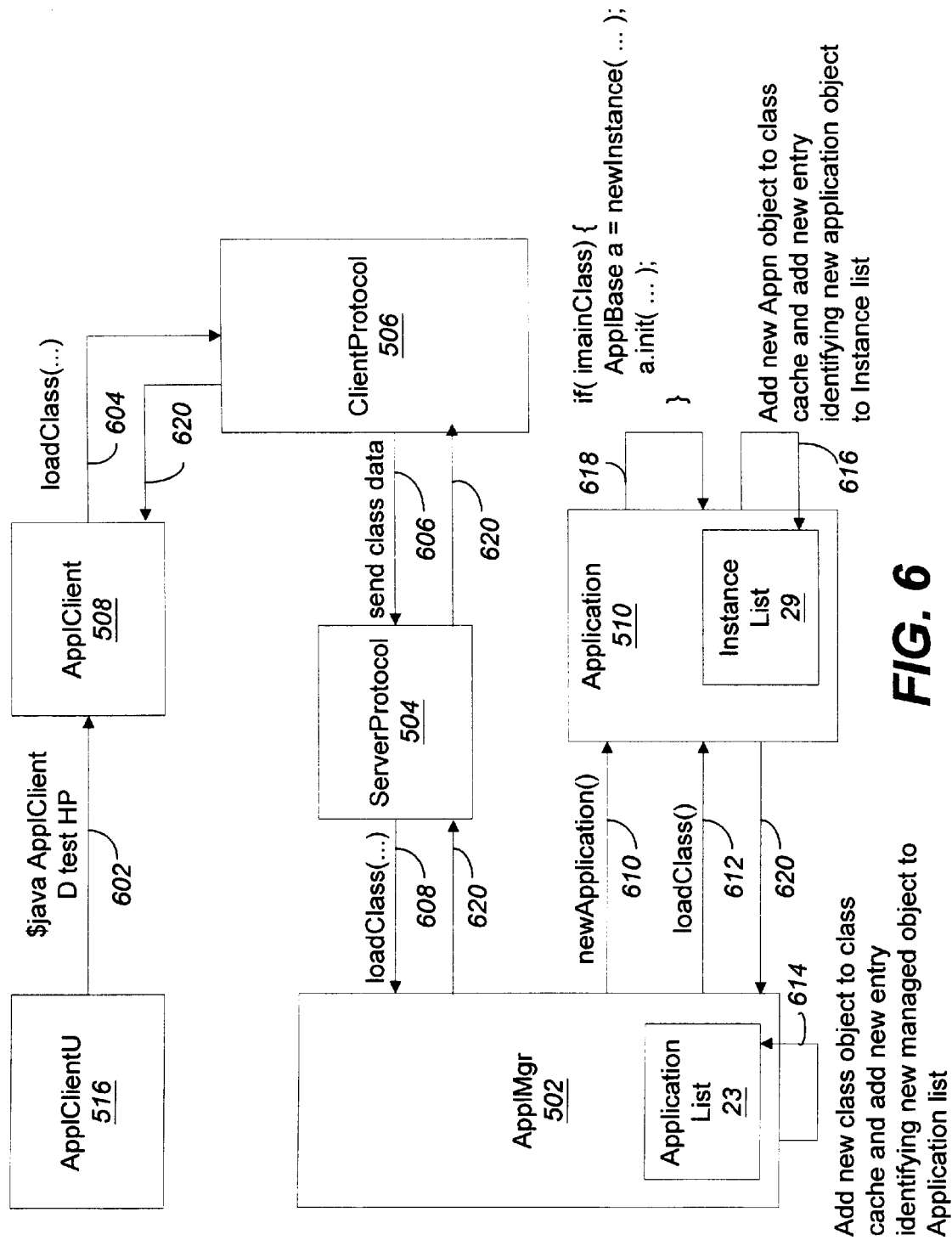
FIG. 6 is a flow diagram illustrating the communications between the classes shown in FIG. 5 for performing a load operation.

FIG. 6 is a block diagram of system 500 illustrating the communications between the classes to perform the loading of a new class. Table 3 specifies the initial assumptions, the results of the load operation, and the required agents for performing the load. As described, it is assumed that an application manager class ApplMgr 502 is running in the JVM 22 of the embedded device 20 and that a user has requested a download by instructing the ApplClient 508 running on the client computer 12 to download the new class to the embedded device 20.

TABLE 3

| | |
| --- | --- |
| Assumptions | ApplMgr is already running in the JVM. |
| Results | The classes associated with an application are loaded into the JVM, an instance of the "main class" is created, and the init() method is called on this new instance. |
| Agents | User = Instructs ApplClient to download new application class to embedded device running ApplMgr
ApplClient = Host side program downloading appl classes
ClientProtocol = Host side class handling network communication for client |

TABLE 3-continued

ServerProtocol = Server side class handling network communication for ApplMgr
ApplMgr = Application Manager class
Application = Application class modeling a downloaded application As illustrated in FIG. 6, a download operation begins with a user request 602 from a client user application such as client user class ApplClientU 516 to client application ApplClient 508. In this example, client user class ApplClientU 516 generates a download request by conforming to the protocol of transmitting a 'D' character followed by the name of the file containing the class data followed by the network node to which the class data is to be transmitted. In this example, the class data is named 'test' and the network node address of the embedded device 20 is named 'HP'. The request 602 causes the ApplClient 508 to be run to download class 'test' to node 'HP'. ApplClient 508 reads the class data contained in 'test' into memory, then calls 604 ClientProtocol.loadClass( ) method to download the class. ClientProtocol 506 forms a network 14 connection to ServerProtocol on node 'HP', and sends 606 the class data associated with class data file 'test' over network 14. ServerProtocol 504 decodes the request and class data, then calls 608 ApplMgr.loadClass( ) method to load the class. ApplMgr 502 creates 610 an Application object for the class if needed (i.e., the class is not already cached in the application cache). ApplMgr 502 then calls 612 the loadClass( ) method on Application 510, passing it all class data associated with class 'test'. The new Application object is added 616 to the ApplMgr cache of Applications and application list ApplMgr.iapps 23 is updated 616 to reflect the addition of class 'test' to its application objects that it manages. If the class 'test' being loaded is a main class, Application defines and resolves the class, creates an instance of the class, and calls the instance's init( ) method, 618. A true result is passed 620 back to the ApplClient signaling successful loading of the class.

In implementation, the ServerProtocol class 504 may, if desired, create a separate thread for handling each request, allowing multiple requests to be processed concurrently. If implemented in this manner, the methods implemented by classes ApplMgr 502 and Application 510 must be synchronized appropriately.

If an Application 510 is made up of multiple classes, a loadClass( ) request will be made for each class. This requires the ApplMgr 502 to be able to locate and add classes to an existing Application object 510. Applications are identified by a unique name, identical to the name of the main class. By convention, base classes and interfaces are loaded prior to loading the main class to ensure that the instance of the main class is created correctly. Another approach would be to create a new ApplMgr method to create an instance of an application. This would allow multiple applications of the same class to be executing concurrently.

Figure 7:
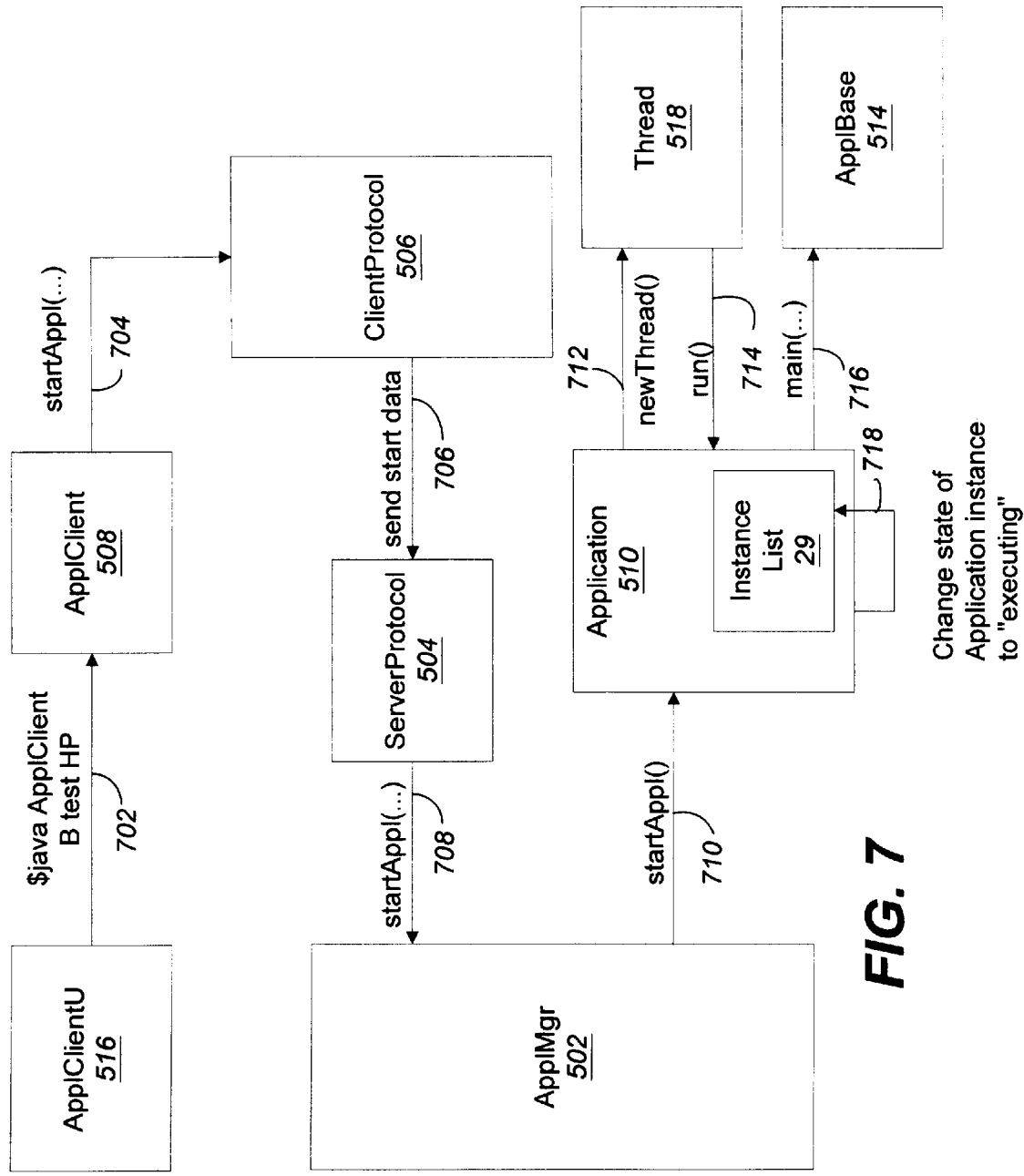
FIG. 7 is a flow diagram illustrating the communications between the classes shown in FIG. 5 for performing a start operation.

FIG. 7 is a block diagram of system 500 illustrating the communications between the classes to perform the starting of an application. Table 4 specifies the initial assumptions, the results of the start operation, and the required agents for performing the start. As described, it is assumed that an application manager class ApplMgr is running in the JVM 22 of the embedded device 20 and that a user has requested a start by instructing the ApplClient running on the user's machine to start the application on embedded device 20.

TABLE 4

| | |
|---|---|
| Assumes | ApplMgr is already running in the JVM. The application classes have been previously loaded by the ApplMgr. |
| Results | The desired Application starts executing. |
| Agents | User = Instructs ApplClient to start application 'test' on node 'HP'.<br>ApplClient = Host side program starting Applications<br>ClientProtocol = Host side class handling network communication for client<br>ServerProtocol = Server side class handling ApplMgr network communication<br>ApplMgr = Application Manager class<br>Application = Application class modeling the application to be started<br>ApplBase = Application instance being started |

As illustrated in FIG. 7, a start operation begins with a user request 702 from a client user application such as client user class ApplClientU 516 to client application ApplClient 508. In this example, client user class ApplClientU 516 generates a start request by conforming to the protocol of transmitting a 'B' character (for 'begin') followed by the application name 'test' followed by the network node 'HP' to which the class data is to be transmitted. The request 702 causes the AppiClient 508 to be run to start application 'test' on node 'HP'. ApplClient 508 calls 704 ClientProtocol.startAppl( ) method to start application. ClientProtocol 506 forms a network connection to ServerProtocol 504 on node 'HP', and sends 706 a start message. ServerProtocol 504 decodes the start request, then calls 708 ApplMgr.startAppl( ) method. ApplMgr 502 locates the correct Application object 510, then calls 710 the startAppl( ) method on Application 510. The Application object 510 creates 712 a new Thread 518 to execute 714 its own run( ) method. Within the run( ) method the ApplBase instance's 514 main method is called 716, passing any parameters. If no parameters are to be passed to the Application instance, the run( ) method could be called directly. Application object 510 then changes 718 the state of the application instance to executing.

In an alternative embodiment, an ApplClass object (i.e., a class loader 512) manages Application classes which model an instance of an Application class 510.

Figure 8:
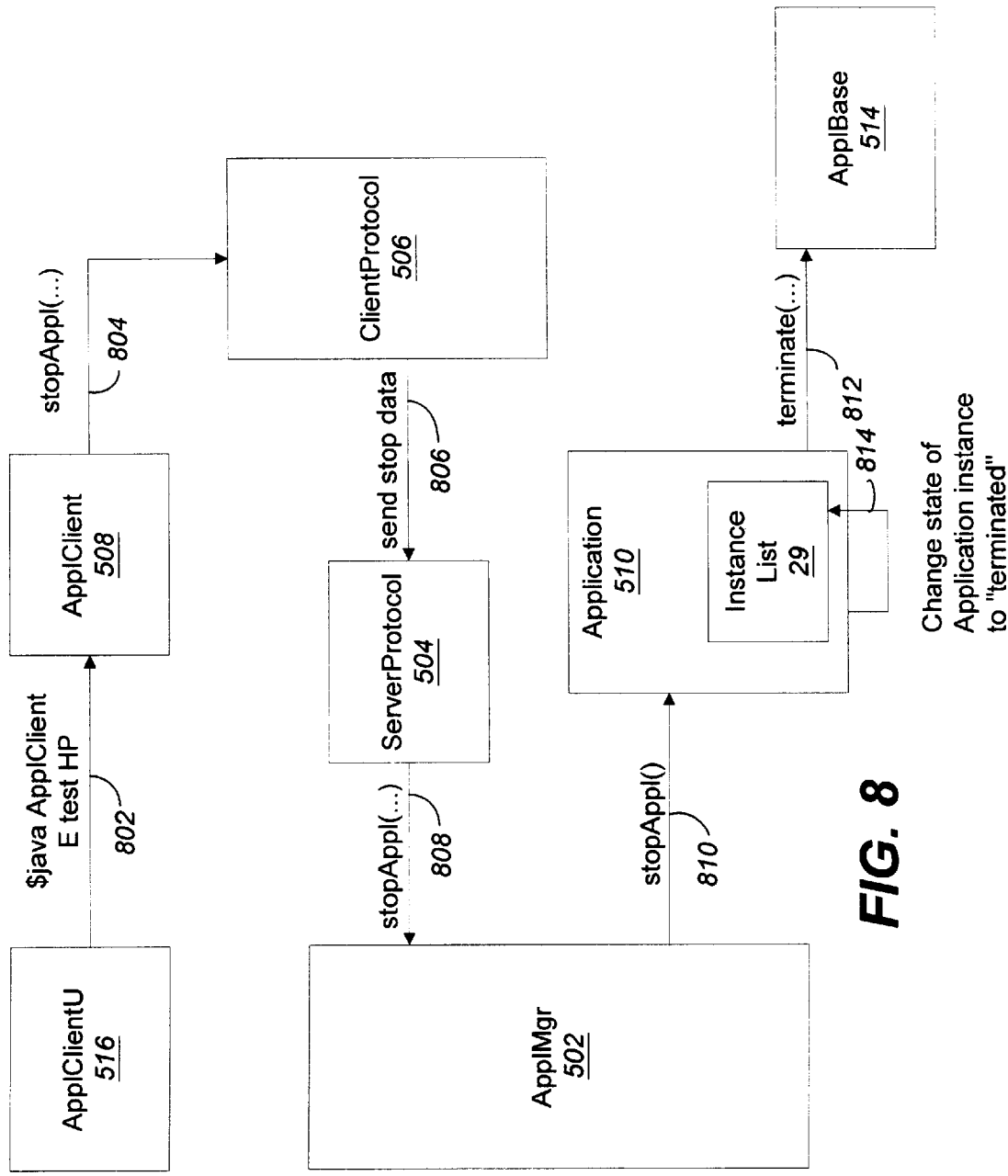
FIG. 8 is a flow diagram illustrating the communications between the classes shown in FIG. 5 for performing a stop operation.

FIG. 8 is a block diagram of system 500 illustrating the communications between the classes to perform the stopping of an application. Table 5 specifies the initial assumptions, the results of the stop operation, and the required agents for performing the stop. As described, it is assumed that an application manager class ApplMgr is running in the JVM 22 of the embedded device 20 and that a user has requested a stop by instructing the ApplClient running on the user's machine to stop the application on embedded device 20.

TABLE 5

| | |
|---|---|
| Assumes | ApplMgr is already running in the JVM.<br>The application classes have been previously loaded by the ApplMgr<br>The application is already running. |
| Results | The desired Application starts executing. |
| Agents | User = Instructs ApplClient to stop application test on node HP.<br>ApplClient = Host side program starting Applications<br>ClientProtocol = Host side class handling network communication for client<br>ServerProtocol = Server side class handling ApplMgr network communication<br>ApplMgr = Application Manager class<br>Application = Application class containing ApplBase instance |

TABLE 5-continued to be stopped
ApplBase = the executing application instance which is to be stopped As illustrated in FIG. 8, a stop operation begins with a user request 802 from a client user application such as client user class ApplClientU 516 to client application ApplClient 508. In this example, client user class ApplClientU 516 generates a stop request by conforming to the protocol of transmitting an 'E ' character (for 'end') followed by the application name 'test' followed by the network node 'HP' to which the class data is to be transmitted. The request 802 causes the ApplClient 508 to be run to stop execution of application 'test' on node 'HP'. ApplClient 508 calls 804 ClientProtocol.stopAppl( ) method to stop the application. ClientProtocol 506 forms a network connection to Server-Protocol 504 on node 'HP', and sends 806 a stop message. ServerProtocol 504 decodes the stop request, then calls 808 ApplMgr.stopAppl( ) method. ApplMgr 502 locates the correct Application object 510, then calls 810 the stopAppl( ) method on Application 510. The Application object 510 locates the ApplBase 514 instance by the name passed into stopAppl( ) and calls 812 its terminate( ) method. Application then uses Thread.join( ) to ensure the ApplBase has terminated. Application object 510 changes 814 the state of the ApplBase 514 instance to terminated.

Stopping an ApplBase 514 instance is an asynchronous event because the application is executing in its own thread. It may be desirable to not actually wait for the application to stop, because if the application does not poll its terminate flag, it will not stop. Accordingly, in implementation, the design may alternatively use a join( ) method with a timeout and then force termination by calling stop( ).

Figure 9:
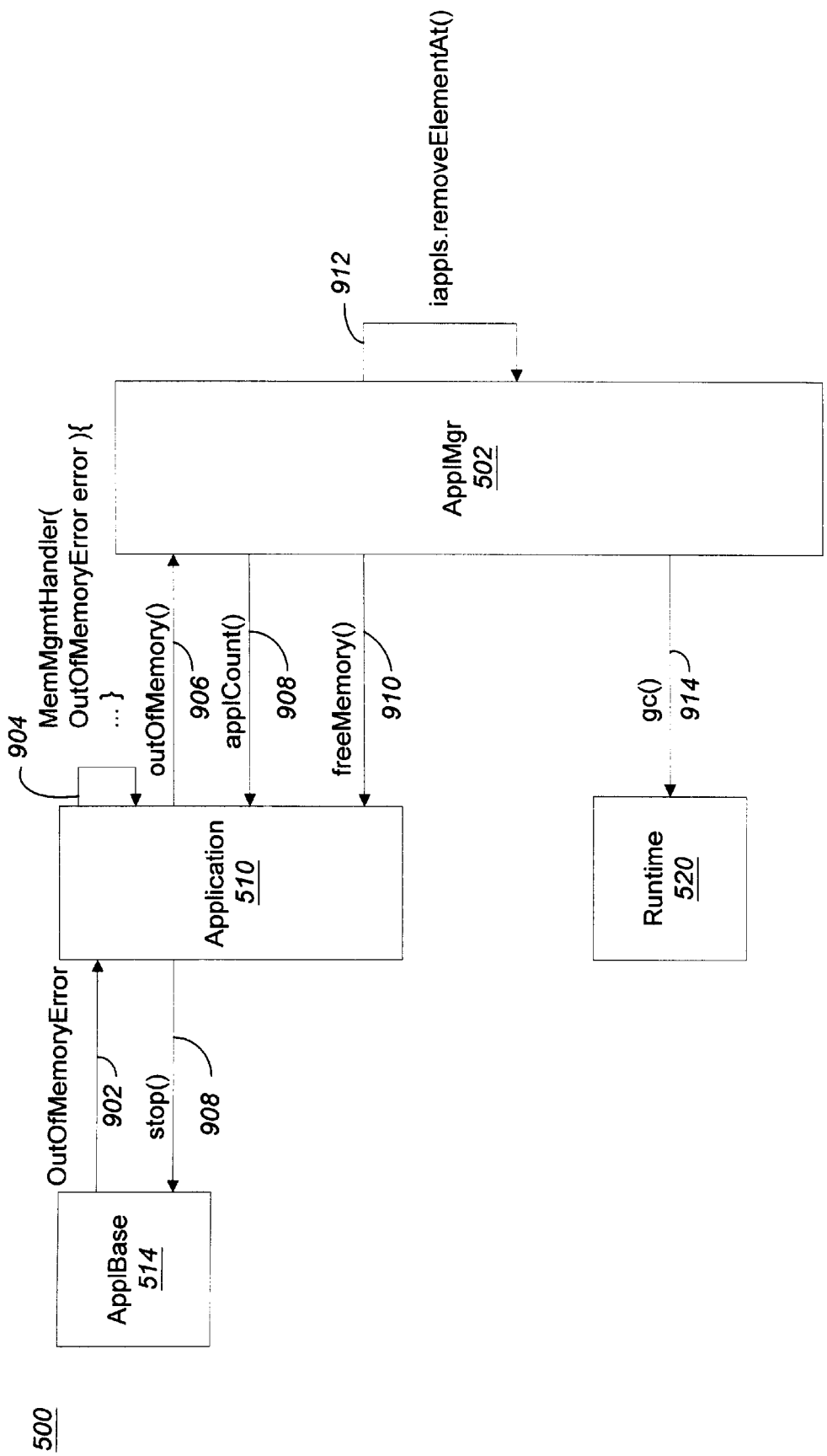
FIG. 9 is a flow diagram illustrating the communications between the classes shown in FIG. 5 for handling an out-of-memory condition.

FIG. 9 is a block diagram of system 500 illustrating the communications between the classes when a low- or no-memory condition occurs during the execution of an instance of an Application 510. Table 6 specifies the initial assumptions, the results of an out-of-memory condition, and the required agents for performing handling the condition. As described, it is assumed that an application manager class ApplMgr 502 is running in the JVM 22 of the embedded device 20 and that one or more application classes are loaded and executing.

TABLE 6

| | |
|---|---|
| Assumptions | ApplMgr is already running in the JVM. One or more application classes are loaded and executing. |
| Results | The JVM and ApplMgr continue to execute, and free up memory by managing user application class and instance caches. |
| Agents | User = Instructs ApplClient to stop application 'test' one e node 'HP'. |
| | ApplClient = Host side program starting Applications |
| | ClientProtocol = Host side class handling network communication for client |
| | ServerProtocol = Server side class handling ApplMgr network communication |
| | ApplMgr = Application Manager class |
| | Application = Application class containing ApplBase instance to be stopped |
| | ApplBase = The executing application instance which is to be stopped |

As illustrated in FIG. 9, an instance ApplBase 514 of a running Application 510 generates 902 an OutOfMemory-Error. Preferably, the OutOfMemoryError is handled 904 by memory management handler 27 within the Application.run( ) method. The handler 27 notifies the ApplMgr 502 of the condition by calling 906 an ApplMgr.outOfMemory( ) method. Application 510 then returns from run( ) to stop 908 the ApplBase 514 thread. ApplMgr 502 iterates through its Application cache 52, finding classes which do not have executing ApplBases by calling 908 Application.applCount( ) method. Those Applications without executing ApplBases are instructed 910 to freeMemory( ), which causes them to dump their class from application cache 52, and set all object references to null. ApplMgr 502 then removes 912 those Applications from its application cache 52, and calls 914 Runtime.gc( ) to cause garbage collection to collect the unreferenced objects, thereby freeing up memory.

As described in detail above, the present invention provides an application manager and API specification which runs within a Java Virtual Machine that is intended for use in electronics devices or appliances and in other embedded systems having environments with limited resource constraints. The invention provides the flexibility to cache and terminate applications for future runs when memory resources become constrained in order to free up memory for higher-priority applications.

What is claimed is:

1. An application manager which manages one or more applications in an embedded device, said embedded device comprising an application cache for storing class objects, an interface for communicating with a remote client, and a hardware independent processor which processes code written in a hardware independent language, said hardware independent processor installed and running on said embedded device and capable of downloading and executing code written in said hardware independent language on said embedded device, said application manager comprising:

a class object list having one or more class object entries each of which identifies a class object currently loaded in said embedded device;

an instance list having one or more instance entries each of which identifies an instance of a corresponding one of said class objects currently loaded in said embedded device;

a class loader method which loads an application class received from said client via said interface, creates a new class object for said application class, stores said new class object in said application cache, adds a class object entry to said class object list identifying said new class object as being loaded in said application cache, instantiates one or more instances of said new class object, and adds an instance entry to said instance list identifying each of said instantiated one or more instances of said new class object.

2. An application manager in accordance with claim 1, wherein:
   each class object identified in said class object list maintains its own instance list.

3. An application manager in accordance with claim 1, wherein:
   each instance entry in said instance list comprises an execution state attribute indicating a current execution state of its corresponding instance.

4. An application manager in accordance with claim 3, comprising:
   a start application method which creates a new instance of a class object and adds said new instance entry to said instance list if said instance to be started does not exist, causes said instance to be started to begin executing, and updates said execution state attribute corresponding to said instance entry in said instance list of said instance to be started to indicate that said instance to be started is currently executing.

5. An application manager in accordance with claim 3, comprising a stop application method which causes an instance to be stopped which is currently executing on said embedded device to stop executing, and updates said execution state attribute corresponding to said instance entry in said instance list of said instance to be stopped to indicate that said instance to be stopped is not executing.

6. An application manager in accordance with claim 1, comprising:
a memory management handler responsive to the detection of a low- or out-of-memory condition which selects a class object cached in said application cache to be unloaded, and unloads said selected class object from said application cache.

7. An application manager in accordance with claim 3, comprising:
a query application method responsive to an indication of an instance of a class object to be queried which indicates said execution state attribute corresponding to said instance to be queried.

8. An application manager in accordance with claim 1, comprising:
a start application method which creates a new instance of a class object and adds said new instance to said instance list if said instance to be started does not exist, and causes said instance to be started to begin executing.

9. An application manager in accordance with claim 1, comprising a stop application method which causes an instance to be stopped which is currently executing on said embedded device to stop executing.

10. An application manager in accordance with claim 1, comprising an unload application method which causes an instance to be unloaded to be removed from said application cache and said instance entry corresponding to said instance to be unloaded to be removed from said instance list.

11. A method for managing applications in an embedded device, said method comprising:
receiving an application class;
creating a new class object for said application class;
storing said new class object in an application cache in said embedded device;
adding a class object entry to a class object list maintained in said embedded device identifying said new class object as being loaded in said application cache;
instantiating one or more instances of said new class object; and
for each instantiated one or more instances of said new class object, adding an instance entry to an instance list maintained in said embedded device identifying each of said instantiated one or more instances of said new class object.

12. A method in accordance with claim 11, comprising:
maintaining a separate instance list for each class object identified in said class object list.

13. A method in accordance with claim 11, comprising:
receiving a start application request indicating an instance of a class object to be started;

if said instance to be started does not exist, instantiating said instance of said class object to be started and adding an instance entry corresponding to said instance to be started to said instance list; and
causing said instance to be started to begin executing.

14. A method in accordance with claim 11, comprising:
receiving a stop application request indicating an instance of a class object to be stopped; and
if said instance to be stopped exists and is currently executing, causing said instance to be stopped to stop executing.

15. A method in accordance with claim 11, comprising:
receiving an unload application request indicating an instance of a class object to be unloaded; and
if said instance to be unloaded exists, causing said instance to be unloaded to be removed from said application cache and said instance entry corresponding to said instance to be unloaded to be removed from said instance list.

16. A method in accordance with claim 11, comprising:
for each instance entry in said instance list, maintaining an execution state attribute indicating a current execution state of said instance corresponding to said instance entry.

17. A method in accordance with claim 16, comprising:
receiving a start application request indicating an instance of a class object to be started;
if said instance to be started does not exist, instantiating said instance of said class object to be started and adding an instance entry corresponding to said instance to be started to said instance list;
causing said instance to be started to begin executing; and
updating said execution state attribute of said instance entry in said instance list of said instance to be started to indicate that said instance to be started is currently executing.

18. A method in accordance with claim 16, comprising:
receiving a stop application request indicating an instance of a class object to be stopped;
if said instance to be stopped exists and is currently executing, causing said instance to be stopped to stop executing; and
updating said execution state attribute corresponding to said instance entry in said instance list of said instance to be stopped to indicate that said instance to be stopped is not executing.

19. An application manager in accordance with claim 16, comprising:
receiving a query application request indicating an instance of a class object to be queried;
if said instance to be queried exists, indicating said execution state attribute corresponding to said instance to be queried.

20. A method in accordance with claim 11, comprising:
detecting a low- or out-of-memory condition;
selecting a class object loaded in said application cache to be unloaded; and
unloading said selected class object from said application cache.

* * * * *